J. B. HEALEY.
SIGNAL DEVICE.
APPLICATION FILED OCT. 17, 1916.
1,256,314.
Patented Feb. 12, 1918.
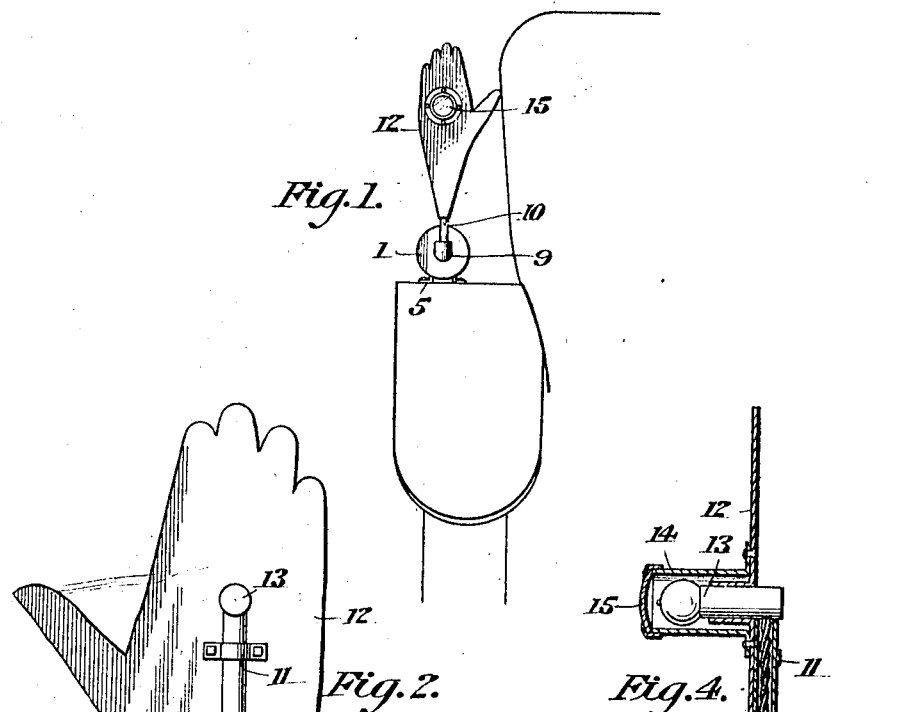
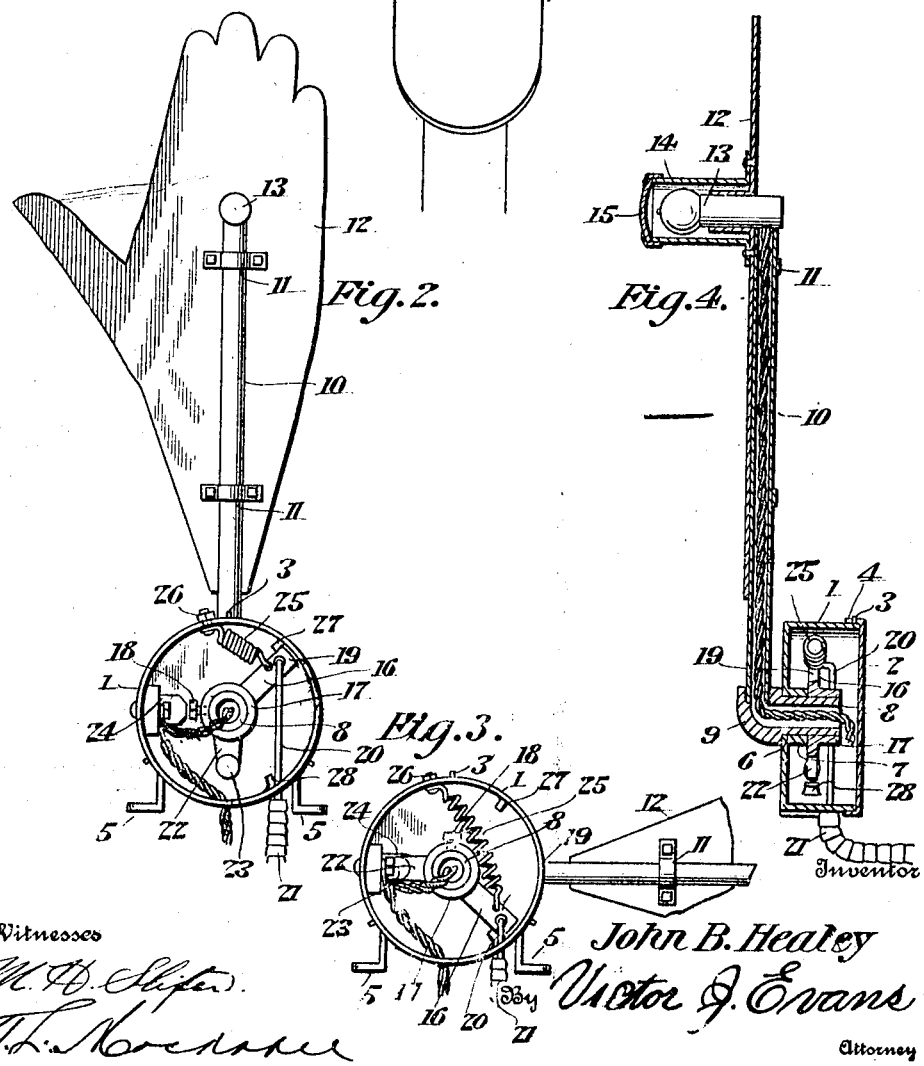
John B. Healey
Victor J. Evans
Attorney

UNITED STATES PATENT OFFICE.

JOHN B. HEALEY, OF SALT LAKE CITY, UTAH.

SIGNAL DEVICE.

1,256,314.  Specification of Letters Patent.  Patented Feb. 12, 1918.

Application filed October 17, 1916.  Serial No. 126,180.

*To all whom it may concern:*

Be it known that I, JOHN B. HEALEY, a citizen of the United States, residing at Salt Lake City, in the county of Salt Lake and State of Utah, have invented new and useful Improvements in Signal Devices, of which the following is a specification.

This invention relates to signals, and has special relation to a signaling device to be used in connection with automobiles or other vehicles.

The object of the invention is to provide a signal for use upon the rear end of a vehicle, to indicate to those following the intentions of the driver in regard to his direction of travel.

Another object is the provision of a signal which may be conveniently operated by the driver, and after such operation will require no further attention, thus enabling the driver to give his undivided attention to the vehicle.

A further object is the provision of a signaling device which is neat and attractive in appearance, simple and economical of construction, and which requires from the driver a minimum amount of attention.

With the above and other objects in view, which will appear from the following description the invention consists of the herein described and illustrated novel combination and arrangement of parts fully set forth in the appended claim.

In the drawings;

Figure 1 is a rear elevation of a portion of a motor vehicle having the signal applied thereto;

Fig. 2 is an elevation of the signal detached from the vehicle, looking toward the side opposite the lamp, and having the casing cap removed and showing the semaphore arm in its raised position;

Fig. 3 is a similar view with the arm lowered to a position to indicate turning;

Fig. 4 is a vertical sectional view with the parts in the position shown in Fig. 2.

In the practical form of the invention, the same consists of a preferably cylindrical casing 1, within which is adapted to be housed the operating parts of the signal for the purpose of protection. This casing is provided with a removable cap 2 preferably secured thereon by means of pins 3 and bayonet slots 4. The casing is further provided with attaching lugs 5 by means of which it may be bolted or otherwise secured to the vehicle. As shown in Fig. 1 the preferable location is upon the left hand rear fender of the vehicle.

The side of the casing opposite the cap 2 is formed with an opening 6, a sleeve 7 projecting inwardly from this opening. A trunnion 8 preferably hollow as shown, has its bearings within the sleeve 7, and is provided with a short elbow 9, into which is screwed a rod or tube 10. Secured to this tube by means of clips 11 is a semaphore arm 12, preferably in the form of a hand, for the purpose of very readily attracting attention. An incandescent electric lamp 13 is secured to the arm near its outer end, and is provided with a shield 14 having a glass or other transparent end 15 by means of which the light from the lamp may be seen.

Upon the inner end of the trunnion 8 is rigidly secured a lever 16, preferably in the form of a bell crank, and having a hub 17 and a set screw 18 to provide the securing means. The long arm 19 of the bell crank has attached to its outer end a pull wire 20, commonly known to the trade as a "Bowden wire", and is slidable through a flexible guiding tube 21. This wire is carried to the forward part of the vehicle and is arranged to be within convenient reach of the driver.

The short arm 22 of the bell crank 16 is provided with a movable contact 23 adapted to engage with a stationary contact 24 for the purpose of lighting the lamp 13 as will appear from the following description:

A spring 25 secured to the arm 19 and to the casing 1 at 26 acts to maintain the signal arm 12 in a vertical position, a stop 27 carried by the casing 1 serving to limit the upward movement of this arm. The stop 28 also carried by the casing which is located in the path of the arm 19 at a point to limit the downward movement of the arm 12, acts to stop this arm in a horizontal line.

An electric circuit connected to the switch formed by the contacts 23 and 24 and lighting the lamp 13, has included therein a suitable source of current for the purpose of illuminating the said lamp.

The operation of the device is as follows: When the vehicle carrying the signal is moving straight ahead the arm remains in the normal position shown in Figs. 1 and 2, the contacts 23 and 24 being disconnected and the light therefore extinguished. Should the driver intend to turn he merely pulls upon the wire 20 until the arm 19 reaches the stop 28, which lowers the arm 12 to a horizontal position and causes the engagement of the contacts 23 and 24, thereby lighting the lamp. Upon the release of the wire 20 the spring immediately pulls up the arm 12 until the arm 19 reaches the stop point 27, breaking the contacts 23 and 24, and extinguishing the lamp.

It will be seen from the foregoing that the invention provides a simple and efficient signal device, for use upon vehicles of all kinds to enable the following vehicles to judge as to the direction of travel.

Having described the invention what I claim, is;

A signal comprising in combination a casing, a concentrically arranged inwardly extending flange provided upon said casing to form a bearing, an elbow member having one of its arms mounted for rotary movement within said elbow the other arm of said elbow bearing against the outer face of the casing to limit the inward movement of the elbow within said casing, a lever, a sleeve provided upon said lever, said sleeve being secured upon the elbow within said casing and bearing against the end of the inwardly extending flange for coöperation with the second mentioned elbow arm to retain the elbow within the bearing, a signal rod carried by the elbow, a signal mounted upon the rod, means connected to said lever and extending without the casing for operating the lever, a spring located within the casing for returning the lever to normal position and stops also located within the casing for limiting the movement of the lever in either direction.

In testimony whereof I affix my signature.

JOHN B. HEALEY.